United States Patent
Chen

(10) Patent No.: US 9,164,731 B2
(45) Date of Patent: Oct. 20, 2015

(54) CIRCUIT AND METHOD FOR GENERATING RANDOM NUMBER

(71) Applicant: Nuvoton Technology Corporation, Hsinchu (TW)

(72) Inventor: Shun-Hsiung Chen, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 340 days.

(21) Appl. No.: 13/831,911

(22) Filed: Mar. 15, 2013

(65) Prior Publication Data

US 2014/0025718 A1     Jan. 23, 2014

(30) Foreign Application Priority Data

Jul. 19, 2012 (TW) .............................. 101126063 A

(51) Int. Cl.
    *G06F 7/58*          (2006.01)

(52) U.S. Cl.
    CPC ...................................... *G06F 7/588* (2013.01)

(58) Field of Classification Search
    None
    See application file for complete search history.

(56) References Cited

U.S. PATENT DOCUMENTS

| 6,195,669 | B1 | 2/2001 | Onodera et al. | |
| 6,369,727 | B1 | 4/2002 | Vincze | |
| 6,542,014 | B1 | 4/2003 | Saito | |
| 2003/0065691 | A1* | 4/2003 | Schmidt | 708/250 |
| 2003/0135527 | A1 | 7/2003 | Lundberg | |
| 2009/0204657 | A1* | 8/2009 | Goettfert et al. | 708/255 |
| 2014/0025718 | A1* | 1/2014 | Chen | 708/254 |

FOREIGN PATENT DOCUMENTS

| TW | 554285 | 9/2003 |
| TW | 201029332 | 8/2010 |

OTHER PUBLICATIONS

"Office Action of Taiwan Counterpart Application", issued on Jun. 26, 2014, p. 1-p. 6, in which the listed references were cited.
"Office Action of Taiwan Counterpart Application," issued on Jun. 16, 2015, p. 1-p. 6, in which the listed reference was cited.

* cited by examiner

*Primary Examiner* — David H Malzahn
(74) *Attorney, Agent, or Firm* — Jianq Chyun IP Office

(57) ABSTRACT

A circuit and a method for generating a random number are provided. The circuit for generating the random number includes an analog-to-digital converter and a controller. The analog-to-digital converter sequentially generates a plurality of digital data in response to an analog signal. The controller utilizes an estimation procedure to sequentially analyze a variation trend of the plurality of digital data in a time sequence or extract components of the plurality of digital data within a preset frequency band. In addition, the controller generates a true random number based on a result of the estimation procedure.

20 Claims, 8 Drawing Sheets

CIRCUIT AND METHOD FOR GENERATING RANDOM NUMBER

CROSS-REFERENCE TO RELATED APPLICATION

This application claims the priority benefit of Taiwan application serial no. 101126063, filed on Jul. 19, 2012. The entirety of the above-mentioned patent application is hereby incorporated by reference herein and made a part of this specification.

BACKGROUND OF THE INVENTION

1. Field of the Invention

The present invention relates to a circuit and a method for generating a random number, and more particularly, to a circuit and a method for generating a random number based on an output of an analog-to-digital converter.

2. Description of Related Art

With vigorous development of computer information and cloud technology, increasingly importance has been attached to data security. In particular, security and confidentiality of data transmission have attracted special attention. Data confidentiality during transmission is closely related to encryption and decryption theory that is used. In general, data encryption and decryption usually uses a key as an operator for data scrambling or an operator for data recovery. Besides, the key used in a system must be generated through an irregular random number.

Accordingly, common electronic devices with the encryption and decryption function must have a random number generator for generating a random number which is used to generate the key for encryption and decryption. However, the disposition of the random number generator necessarily increases the hardware space and manufacturing cost of the electronic device. Therefore, simplifying the circuit architecture of the random number generator to reduce the manufacturing cost and hardware space of the electronic device has become an important subject in designing the random number generator.

SUMMARY OF THE INVENTION

An embodiment of the present invention provides a method for generating a random number. The method includes the following steps. Firstly, an analog signal is used to cause an analog-to-digital converter to sequentially generate a plurality of digital data. Besides, an estimation procedure is utilized to sequentially analyze a variation trend of the plurality of digital data in a time sequence or extract components of the plurality of digital data within a preset frequency band. In addition, a true random number is generated based on a result of the estimation procedure.

An embodiment of the present invention provides a circuit for generating a random number, which includes an analog-to-digital converter and a controller. The analog-to-digital converter sequentially generates a plurality of digital data in response to an analog signal. The controller utilizes an estimation procedure to sequentially analyze a variation trend of the plurality of digital data in a time sequence or sequentially extract components of the plurality of digital data within a preset frequency band. In addition, the controller generates a true random number based on a result of the estimation procedure.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
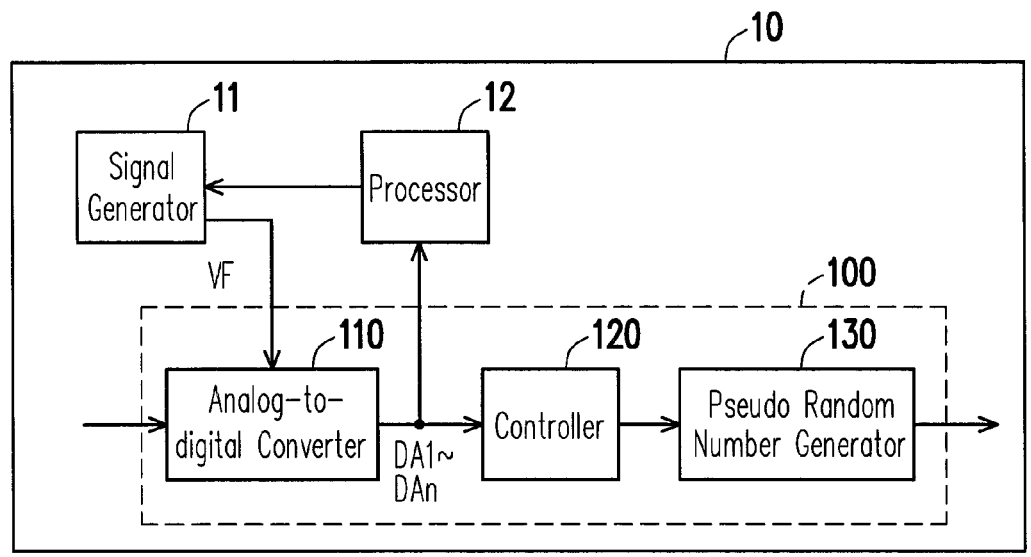
FIG. 1 is a block diagram of a circuit for generating a random number according to one embodiment of the present invention.

FIG. 1 is a block diagram of a circuit for generating a random number according to one embodiment of the present invention. Referring to FIG. 1, in practice, the random number generating circuit 100 may, for example, be disposed in an electronic device 10. In addition, for ease of description, FIG. 1 further illustrates a signal generator 11 and a processor 12 of the electronic device 10.

As shown in FIG. 1, the random number generating circuit 100 includes an analog-to-digital converter 110, a controller 120, and a pseudo random number generator 130. The analog-to-digital converter 110 is used to convert a signal (analog signal) that continuously changes along a time axis into non-continuous digital values (digital signals). For example, a fixed voltage VF generated by the signal generator 11 is an analog signal. Therefore, when the analog-to-digital converter 110 converts the fixed voltage VF, the analog-to-digital converter 110 sequentially generates a plurality of digital data DA1 to DAn in response to the fixed voltage VF. While the analog signal (i.e. the fixed voltage VF) is provided by the signal generator 11 in this embodiment, it is noted, however, that this should not be regarded as limiting. For example, in another embodiment, an analog signal (e.g. a fixed voltage VF) can be set in the analog-to-digital converter 110, which enables the analog-to-digital converter 110 to generate a plurality of corresponding digital data directly in response to the internal analog signal (e.g. the fixed voltage VF).

It is noted that, theoretically, the analog-to-digital converter 110 generates the digital data DA1 to DAn that are constant in value in response to the analog signal (e.g. the fixed voltage VF). That is, theoretically, when the inputted voltage is fixed, the value of the digital data DA1 to DAn does not change with time. However, various noises, such as, thermal noise, power noise, or the like, exist in the real environment. The thermal noise is caused by agitation of electrons and exists in all electronic devices and transmission media. In addition, the thermal noise has an even distribution within a frequency band and, as such, the thermal noise is often called additive white Gaussian noise (AWGN). Besides, the thermal noise varies randomly and irregularly.

Accordingly, in the real environment, the digital data DA1 to DAn generated by the analog-to-digital converter 110 vary due to the thermal noise. Taking a sigma-delta analog-to-digital converter for example, FIG. 2 illustrates a plurality of digital data, which the sigma-delta analog-to-digital converter sequentially generates in response to a fixed voltage in the real environment, wherein the X axis indicates the sampling points at which the analog-to-digital converter takes samples, and the Y axis represents the value of each digital data.

Figure 2:
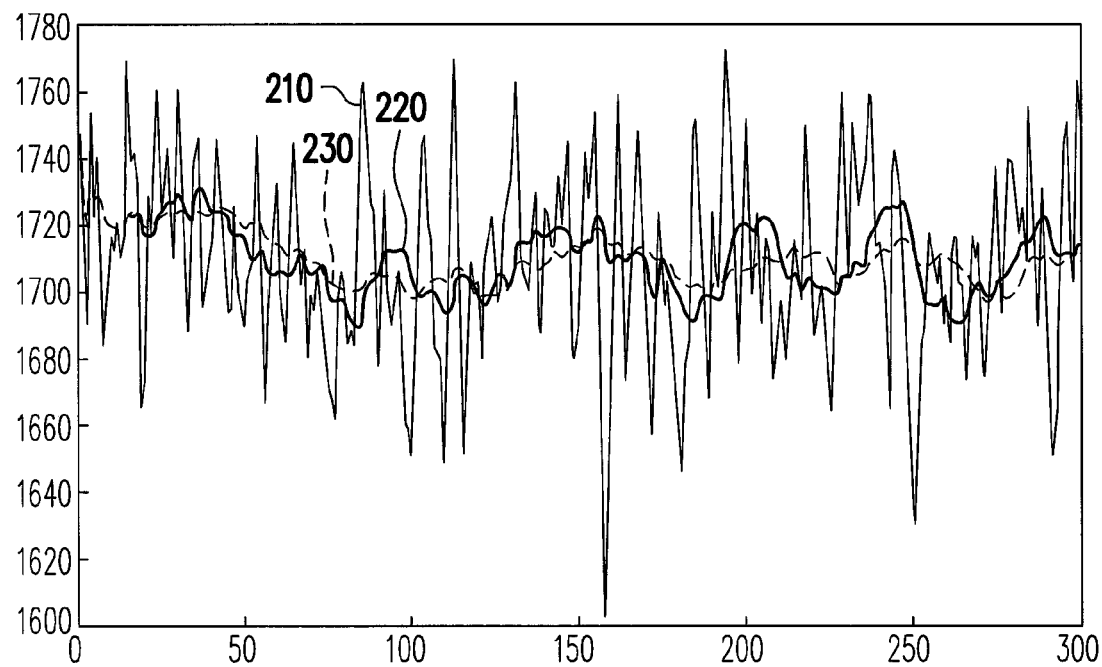
FIG. 2 illustrates a plurality of digital data generated by the sigma-delta analog-to-digital converter sequentially in response to a fixed voltage in the real environment.

As shown in FIG. 2, due to the noise, although a voltage received by the sigma-delta analog-to-digital converter is the fixed voltage, namely, a voltage level of the received voltage does not vary with time, the value of the digital data generated by the sigma-delta analog-to-digital converter varies with time (see Curve 210). In addition, Curve 220 and Curve 230 illustrate moving average of the digital data based on sixteen sampling points and thirty-two sampling points, respectively. As can be seen from Curves 210 to 230, a variation trend of the digital data is similar to that of the thermal noise. That is, the digital data vary irregularly with time.

Figure 3:
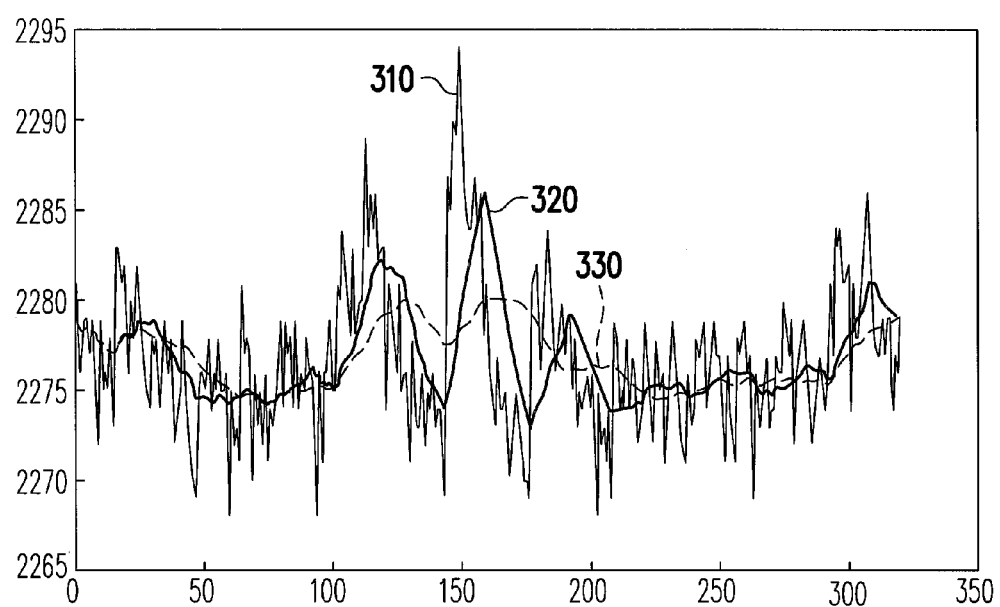
FIG. 3 illustrates a plurality of digital data generated by the SAR analog-to-digital converter sequentially in response to a fixed voltage in the real environment.

Taking a successive approximation register (SAR) analog-to-digital converter for another example, FIG. 3 illustrates a plurality of digital data, which the SAR analog-to-digital converter sequentially generates in response to a fixed voltage in the real environment, wherein the X axis indicates the sampling points at which the SAR analog-to-digital converter takes samples, and the Y axis represents the value of each digital data. As shown in FIG. 3, due to the noise, although a voltage received by the SAR analog-to-digital converter is the fixed voltage, namely, a voltage level of the received voltage does not vary with time, the value of the digital data generated by the SAR analog-to-digital converter varies with time (see Curve 310). In addition, Curve 320 and Curve 330 illustrate moving average of the digital data based on sixteen sampling points and thirty-two sampling points, respectively. As can be seen from Curves 310 to 330, a variation trend of the digital data is similar to that of the thermal noise. That is, the digital data vary irregularly with time.

Figure 4:
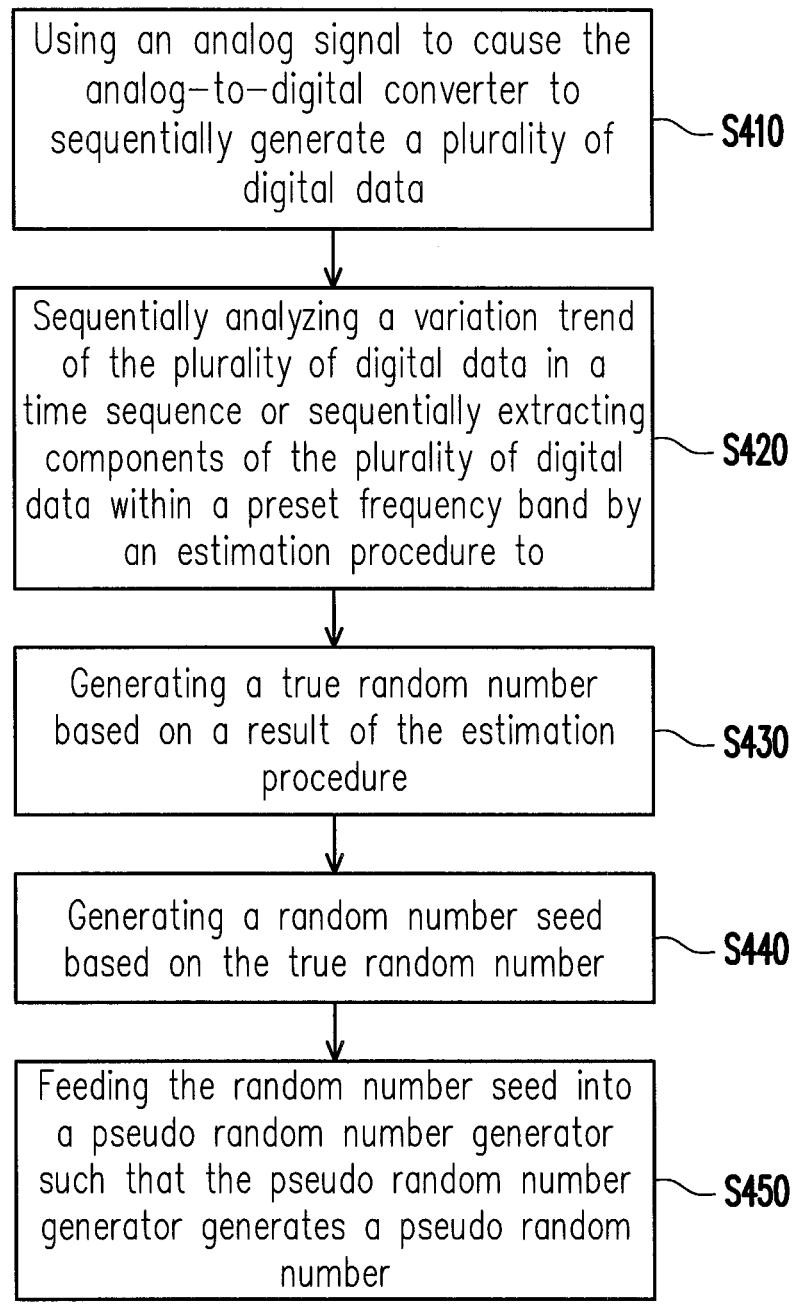
FIG. 4 illustrates a flow chart of a random number generating method according to one embodiment of the present invention

In other words, in the real environment, no matter which architecture the analog-to-digital converter 110 has, it is possible that its output contains a variation amount that varies irregularly. Accordingly, based on this characteristic, the present embodiment generates a random number based on the digital data generated by the analog-to-digital converter 110. As such, the circuit structure of the random number generating circuit 100 can be simplified, which facilitates reducing the hardware space and manufacturing cost of the random number generating circuit 100. In order for people skilled in the art to have a more comprehensive understanding of the present embodiment, FIG. 4 illustrates a flow chart of a random number generating method according to one embodiment of the present invention. Detailed operations of the random number generating circuit 100 are discussed below with reference to FIG. 1 and FIG. 4.

At step S410, an analog signal (e.g. a fixed voltage VF) is used to cause the analog-to-digital converter 110 to sequentially generate a plurality of digital data DA1 to DAn. The analog-to-digital converter 110 can selectively receive the analog signal (e.g. the fixed voltage VF) or an input voltage other than the fixed voltage VF. In one embodiment, the analog-to-digital converter 110 has a fixed input mode. When switched to the fixed input mode, the analog-to-digital converter 110 is isolated from the input voltage and converts the fixed voltage VF. In addition, in another embodiment, the analog-to-digital converter 110 can receive a control signal through a general purpose input/output (GPIO) pin and determines whether to convert the fixed voltage VF or the input voltage based on the control signal. In other words, the analog-to-digital converter 110 can obtain the fixed voltage in a variety of different manners.

At step S420, the controller 120 utilizes an estimation procedure to sequentially analyze a variation trend of the plurality of digital data DA1 to DAn in a time sequence or sequentially extract components of the plurality of digital data DA1 to DAn within a preset frequency band. As such, at step S430, the controller 120 can generate a true random number based on a result of the estimation procedure.

For example, as shown in FIG. 2 and FIG. 3, due to the noise, the value of the digital data varies irregularly. That is, the variation of the plurality of digital data DA1 to DAn, which occurs sequentially over time, is irregular. Therefore, the random number, which varies irregularly, can be defined by estimating the variation trend of the plurality of digital data DA1 to DAn in the time sequence. Estimation of the variation trend of the plurality of digital data DA1 to DAn can be implemented in different ways. For example, the variation trend of the plurality of digital data DA1 to DAn can be estimated according to a comparison between the digital data and an average, a comparison between any two adjacent digital data, a difference between the digital data and the average, varied data bits in the digital data, or the like.

In order for people skilled in the art to have a more comprehensive understanding of the present embodiment, more examples are further discussed below, which describe the detailed flow chart of the estimation procedure of step S420 and true random number generation of step S430.

Figure 5:
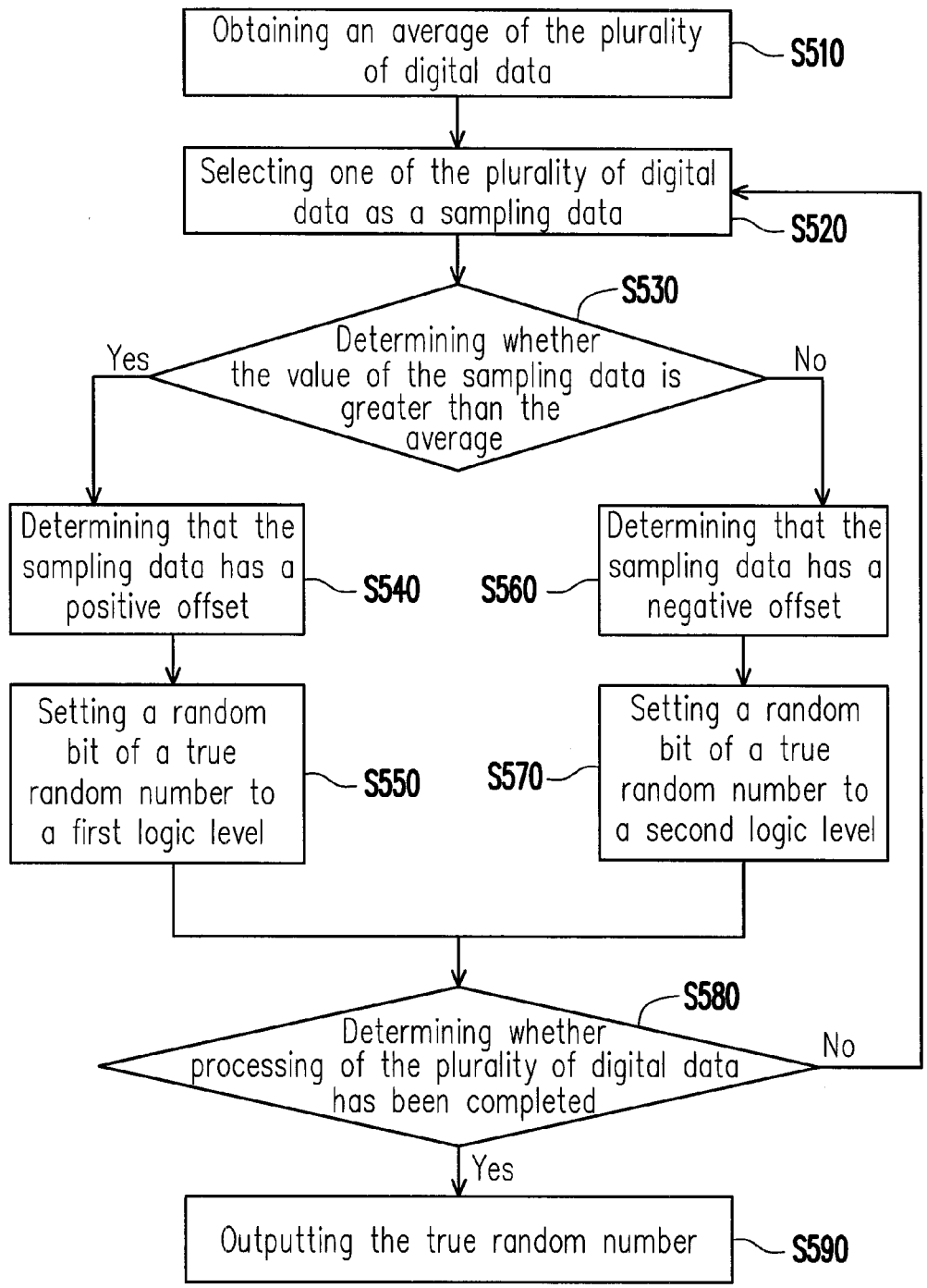
FIG. 5 illustrates a detailed flow chart of step S420 and step S430 according to one embodiment of the present invention.

FIG. 5 illustrates a detailed flow chart of step S420 and step S430 according to one embodiment of the present invention. In the embodiment of FIG. 5, the digital data and the average are compared to estimate the variation trend of the digital data and hence generate the true random number. One example of the random number generation by the random number generating circuit 100 is discussed below with respect to FIG. 1 and FIG. 5.

At step S510, in one embodiment, the controller 120 calculates an average of the plurality of digital data DA1 to DAn. That is, the controller 120 obtains the average of the plurality of digital data DA1 to DAn. In addition, at step S520, the controller 120 selects one digital data (e.g. DA1) from the plurality of digital data DA1 to DAn and sets the selected digital data as a sampling data. At step S530, the controller 120 determines whether the value of the sampling data is greater than the average. If the value of the sampling data is greater than the average, then the controller 120 determines that the sampling data has a positive offset and sets a random bit of the true random number to a first logic level (e.g. logic 1) at step S540 and step S550.

On the other hand, if the value of the sampling data is not greater than the average, then the controller 120 determines that the sampling data has a negative offset and sets a random bit of the true random number to a second logic level (e.g. logic 0) at step S560 and step S570. Afterwards, at step S580, the controller 120 determines whether processing of the plurality of digital data DA1 to DAn has been completed. If processing of the plurality of digital data DA1 to DAn has not been completed, then the method returns to step S520 to re-select a digital data (e.g. DA2) as a sampling data. Thereby, the controller 120 can again set a random bit of the true random number according to the selected digital data. As such, a plurality of random bits of the true random number are sequentially set. In addition, after processing of the plurality of digital data DA1 to DAn has been completed, it means that each random bit of the true random number has been set. Therefore, at step S590, the controller 120 currently can output the true random number allowing the electronic device 10 to use.

Figure 6:
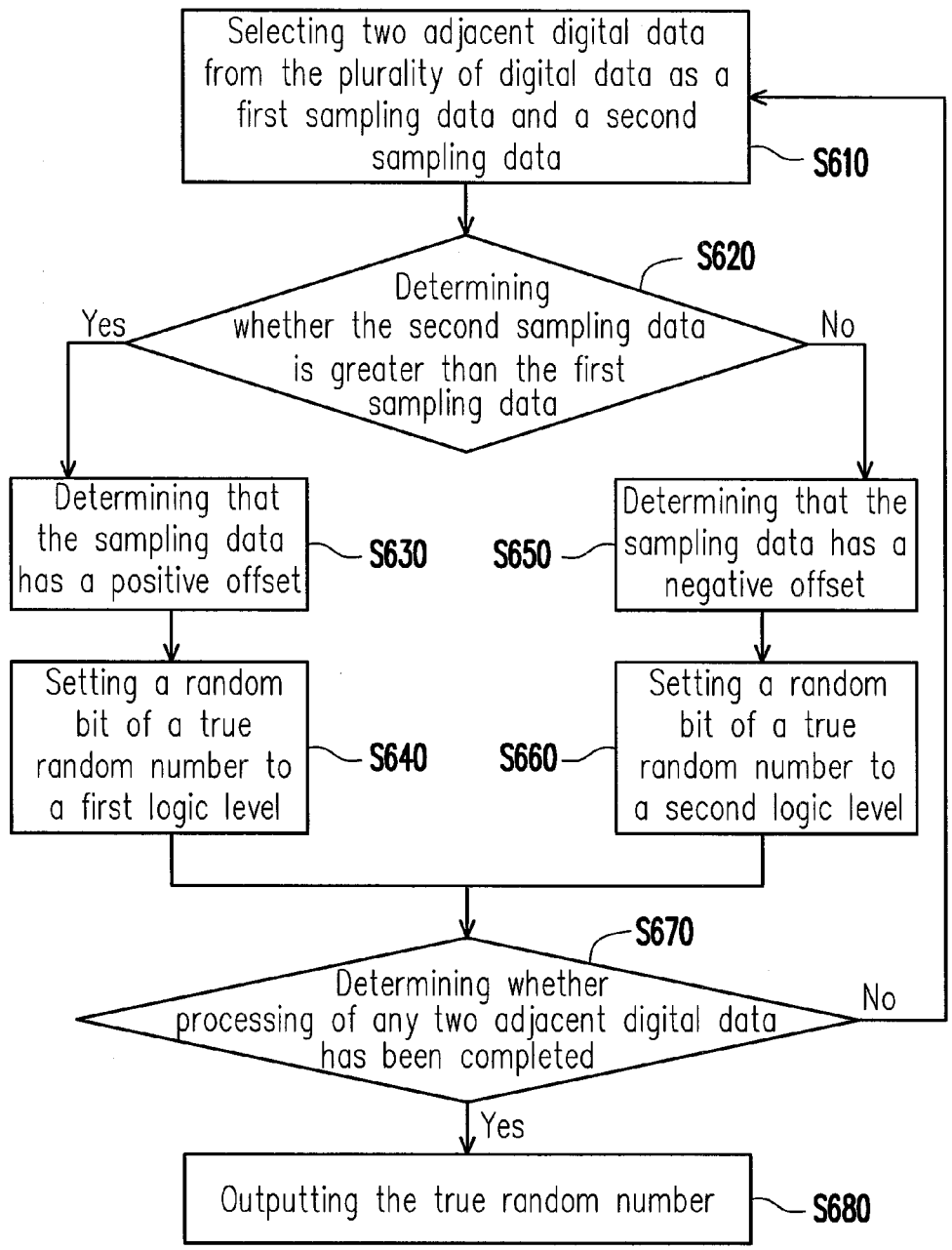
FIG. 6 illustrates a detailed flow chart of step S420 and step S430 according to another embodiment of the present invention.

FIG. 6 illustrates a detailed flow chart of step S420 and step S430 according to another embodiment of the present invention. In the embodiment of FIG. 6, any two adjacent digital data are compared to estimate the variation trend of the digital data and hence generate the true random number. Another example of the random number generation by the random number generating circuit 100 is discussed below with respect to FIG. 1 and FIG. 6.

At step S610, in one embodiment, the controller 120 selects two adjacent digital data (e.g. DA1 and DA2) from the plurality of digital data DA1 to DAn as a first sampling data and a second sampling data. In addition, at step S620, the controller 120 determines whether the second sampling data is greater than the first sampling data. If the second sampling data is greater than the first sampling data, then the controller 120 determines that the second sampling data has a positive offset and then sets a random bit of the true random number to a first logic level (e.g. logic 1) at step S630 and step S640.

On the other hand, if the second sampling data is not greater than the first sampling data, then the controller 120 determines that the sampling data has a negative offset and then sets a random bit of the true random number to a second logic level (e.g. logic 0) at step S650 and step S660. Afterwards, at step S670, the controller 120 determines whether processing of any two adjacent digital data has been completed. If processing of any two adjacent digital data has not been completed, then the method returns to step S610 to re-select two adjacent digital data (e.g. DA2 and DA3) as the first sampling data and the second sampling data. Thereby, the controller 120 can again set a random bit of the true random number according to the two selected digital data. As such, a plurality of random bits of the true random number are sequentially set. In addition, after processing of any two adjacent digital data has been completed, it means that each random bit of the true random number has been set. Therefore, at step S680, the controller 120 currently can output the true random number allowing the electronic device 10 to use.

Figure 7:
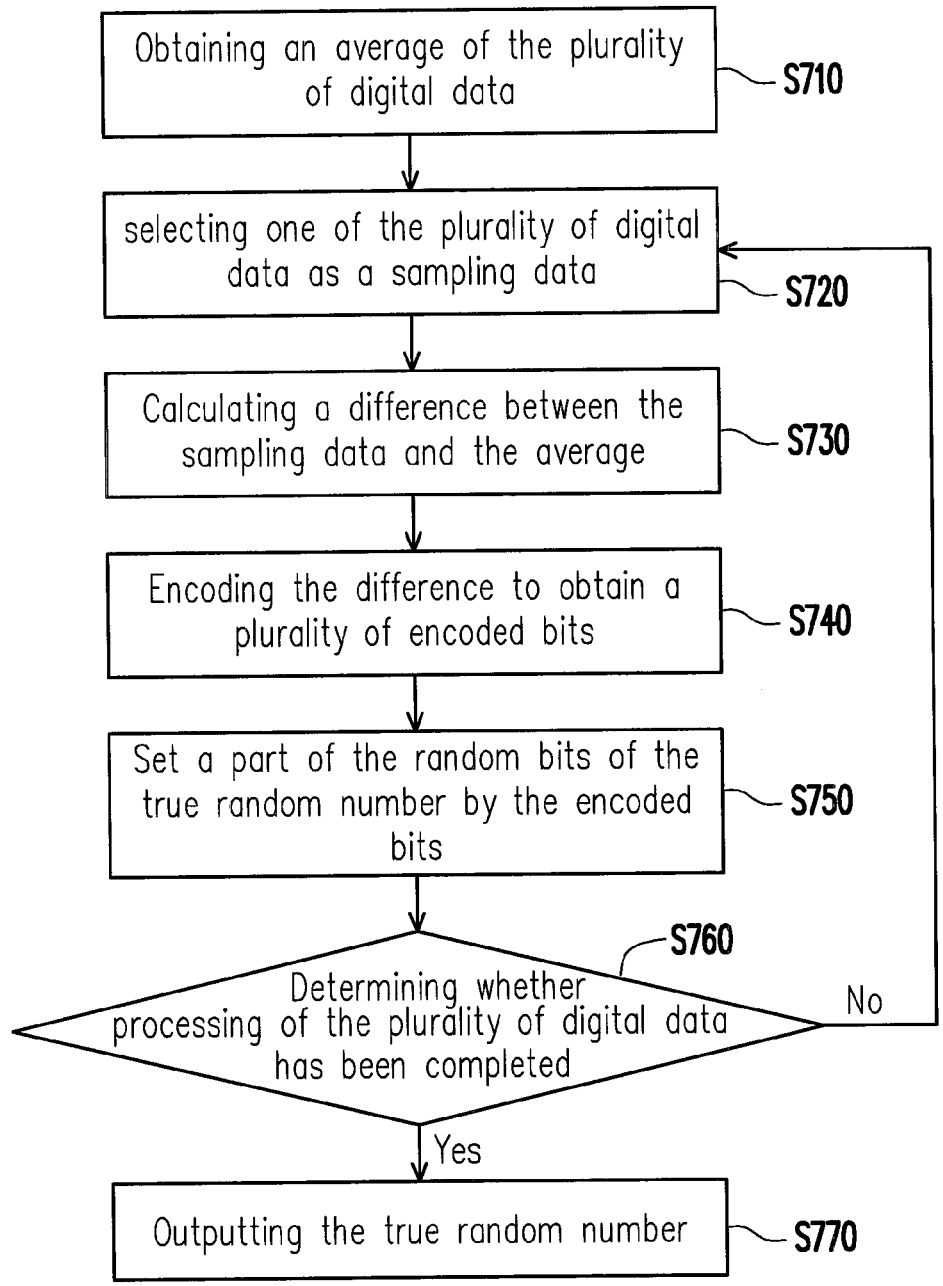
FIG. 7 illustrates a detailed flow chart of step S420 and step S430 according to another embodiment of the present invention.

FIG. 7 illustrates a detailed flow chart of step S420 and step S430 according to another embodiment of the present invention. In the embodiment of FIG. 7, a difference between the digital data and an average is used to estimate the variation trend of the digital data and hence generate the true random number. Another example of the random number generation by the random number generating circuit 100 is discussed below with respect to FIG. 1 and FIG. 7.

At step S710, in one embodiment, the controller 120 obtains an average of the plurality of digital data DA1 to DAn. In addition, at step S720, the controller 120 selects one digital data (e.g. DA1) from the plurality of digital data DA1 to DAn and sets the selected digital data as a sampling data. At step S730, the controller 120 calculates a difference between the sampling data and the average. In addition, at step S740, the controller 120 encodes the difference to obtain a plurality of encoded bits. Thereby, at step S750, the controller 120 can set a part of the random bits of the true random number based on these encoded bits. For example, if the controller 120 encodes the difference into three encoded bits (e.g. 001), the three random bits of the true random number can be set based on the three encoded bits.

Afterwards, at step S760, the controller 120 further determines whether processing of the plurality of digital data DA1 to DAn has been completed. If processing of the digital data DA1 to DAn has not been completed, then the method returns to step S720 to re-select a digital data (e.g. DA2) as a sampling data. Thereby, the controller 120 can again set a part of the random bits of the true random number according to the selected digital data. As such, the random bits of the true random number are sequentially set. In addition, after processing of the digital data DA1 to DAn has been completed, the controller 120 currently can output the true random number allowing the electronic device 10 to use at step S770.

Figure 8:
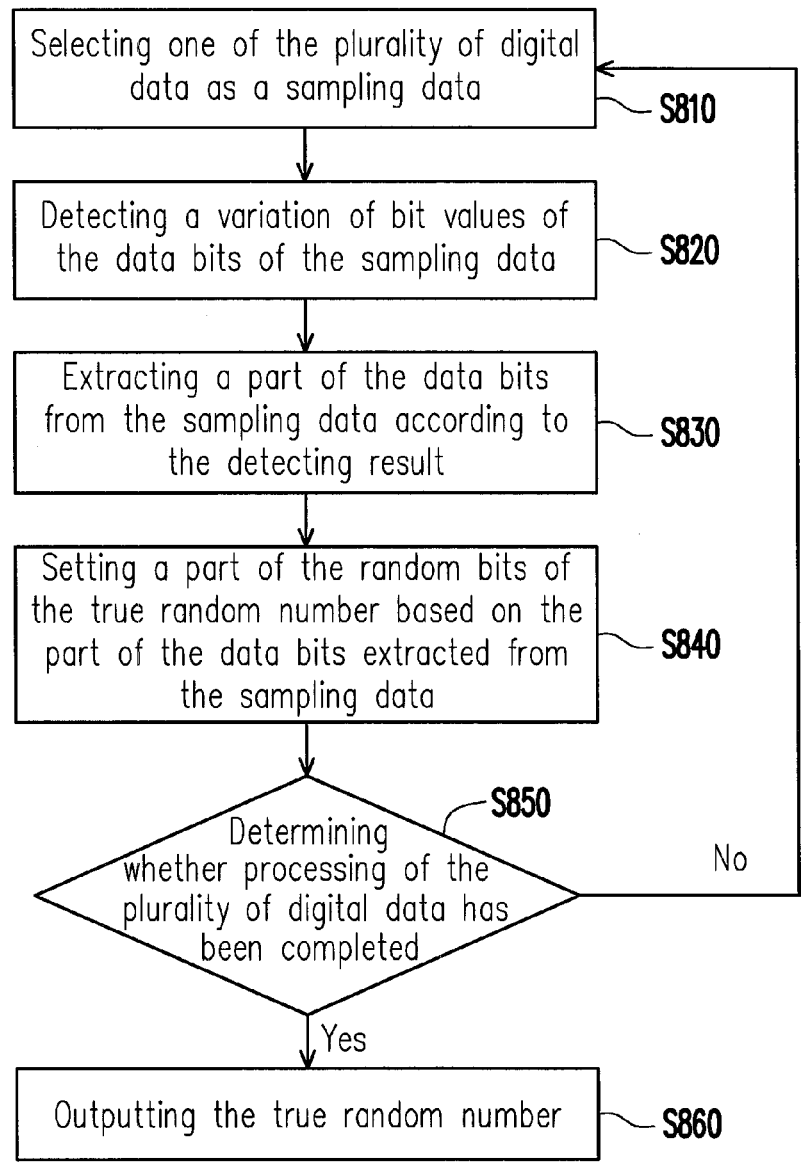
FIG. 8 illustrates a detailed flow chart of step S420 and step S430 according to another embodiment of the present invention.

FIG. 8 illustrates a detailed flow chart of step S420 and step S430 according to still another embodiment of the present invention. In the embodiment of FIG. 8, varied data bits of the digital data are used to estimate the variation trend of the digital data and hence generate the true random number. Another example of the random number generation by the random number generating circuit 100 is discussed below with respect to FIG. 1 and FIG. 8.

At step S810, in one embodiment, the controller 120 selects one digital data (e.g DA1) from the plurality of digital data DA1 to DAn and sets the selected digital data as a sampling data. In addition, at step S820, the controller 120 detects a variation of bit values of the data bits of the digital data. At step S830, the controller 120 then extracts a part of the data bits from the digital data according to the detecting result. Thereby, at step S840, the controller 120 can set a part of the random bits of the true random number based on the part of the data bits extracted from the digital data.

For example, if the detecting result is that the bit values of six lower data bits of the digital data vary, then the controller 120 can selectively extract part or all of the data bits from the six lower data bits. For example, the controller 120 can extract the six lower data bits to set six random bits of the true random number. Alternatively, the controller can extract three data bits from the six lower data bits to set three random bits of the true random number. Alternatively, the controller can extract the lowest data bit from the six lower data bits to set one random bit of the true random number.

Afterwards, at step S850, the controller 120 further determines whether processing of the digital data DA1 to DAn has been completed. If processing of the plurality of digital data DA1 to DAn has not been completed, then the method returns to step S810 to re-select a digital data (e.g. DA2) as a sampling data. Thereby, the controller 120 can again set a part of the random bits of the true random number according to the selected digital data. As such, the random bits of the true random number are sequentially set. In addition, after processing of the plurality of digital data DA1 to DAn has been completed, the controller 120 currently can output the true random number allowing the electronic device 10 to use at step S860.

Figure 9:
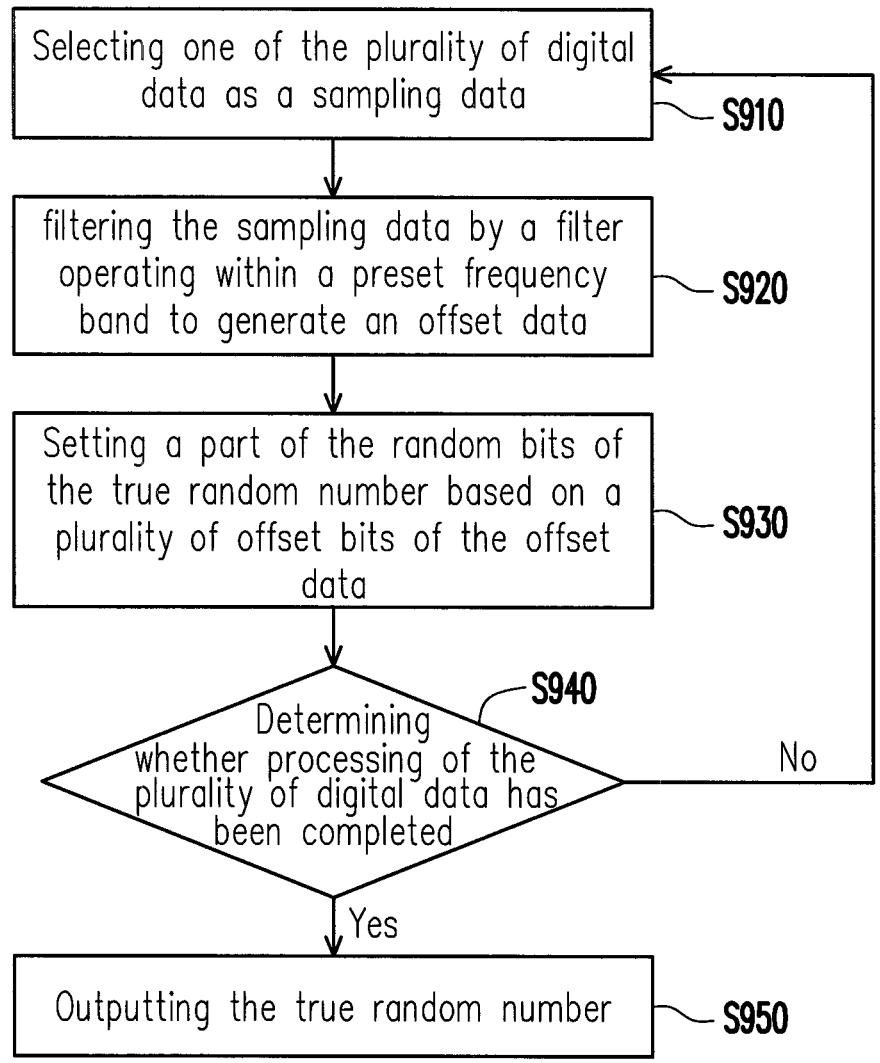
FIG. 9 illustrates a detailed flow chart of step S420 and step S430 according to still another embodiment of the present invention.

It is noted that, due to the noise, components of the digital data within a certain frequency band may vary irregularly. Therefore, it is also possible to extract components of the plurality of digital data DA1 to DAn within a preset frequency band to generate the irregularly varying random number. For example, FIG. 9 illustrates a detailed flow chart of step S420 and step S430 according to still another embodiment of the present invention.

At step S910, in one embodiment, the controller 120 selects one digital data (e.g. DA1) from the plurality of digital data DA1 to DAn and sets the selected digital data as a sampling data. In addition, at step S920, the controller 120 utilizes a filter operating within a preset frequency band to filter the sampling data to thereby generate an offset data. Thereby, at step S930, the controller 120 sets a part of the random bits of the true random number based on a plurality of offset bits of the offset data. Afterwards, at step S940, the controller further determines whether processing of the plurality of digital data DA1 to DAn has been completed. If processing of the plurality of digital data DA1 to DAn has not been completed, then the method returns to step S910 to re-select a digital data (e.g. DA2) as a sampling data. Thereby, the controller 120 can again set a part of the random bits of the true random number according to the selected digital data. After the plurality of digital data DA1 to DAn have been sequentially selected, the controller 120 currently can output the true random number allowing the electronic device 10 to use at step S950.

With continuous reference to FIG. 1 and FIG. 4, the random number generating circuit 100 can further generate a pseudo random number according to the true random number generated by the controller 120. For example, at step S440, the controller 120 can generate a random number seed according to the true random number. Thereby, at step S450, after the random number seed is fed into a pseudo random number generator 130, the pseudo random number generator 130 can generate a pseudo random number. The pseudo random number generator 130 may be implemented by a linear feedback shift register (LFSR) having a Galois structure or a Fibonacci structure.

On the other hand, in its application, the plurality of digital data DA1 to DAn outputted by the analog-to-digital converter 110 can be further supplied to the electronic device for use, thereby achieving the purpose of sharing the analog-to-digital converter 110. For example, in order to calibrate the fixed voltage VF generated by the signal generator 11, the processor 12 of the electronic device 10 can determine whether the voltage level of the fixed voltage VF complies with the desired set value according to the digital data DA1 to DAn. In addition, the processor 12 can further control the signal generator 11 to adjust the voltage level of the fixed voltage VF to the set value based on the determining result.

In summary, embodiments of the present invention utilize an analog signal to cause the analog-to-digital converter to generate a plurality of digital data and utilize an estimation procedure to analyze or extract the plurality of digital data generated by the analog-to-digital converter. The digital data generated by the analog-to-digital converter vary irregularly due to the noise. Therefore, embodiments of the present invention can generate the true random number based on the result of the estimation procedure. As such, the method for generating the random number or the circuit structure of the random number generating circuit can be simplified, which facilitates reducing the hardware space and manufacturing cost of the random number generating circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a random number, adapted for an electronic device, the method for generating a random number, comprising:

using an analog signal inherent in the electronic device to cause an analog-to-digital converter to sequentially generate a plurality of digital data, wherein the analog-to-digital converter is shared in the electronic device;

sequentially analyzing a variation trend of the plurality of digital data in a time sequence by using an estimation procedure or sequentially extracting components of the plurality of digital data within a preset frequency band by using the estimation procedure; and generating a true random number based on a result of the estimation procedure.

2. The method for generating the random number according to claim 1, further comprising:

generating a random number seed based on the true random number; and feeding the random number seed into a pseudo random number generator such that the pseudo random number generator generates a pseudo random number.

3. The method for generating the random number according to claim 1, wherein the step of sequentially analyzing the variation trend of the plurality of digital data in the time sequence by using the estimation procedure comprises:

obtaining an average of the plurality of digital data;

selecting the plurality of digital data one by one so as to sequentially set each of the plurality of digital data as a sampling data;

determining whether a value of the sampling data is greater than the average;

if the value of the sampling data is greater than the average, determining that the sampling data has a positive offset; and if the value of the sampling data is not greater than the average, determining that the sampling data has a negative offset.

4. The method for generating the random number according to claim 3, wherein the true random number comprises a plurality of random bits, and the step of generating the true random number based on the result of the estimation procedure comprises:

if the sampling data has the positive offset, setting one of the random bits to a first logic level; and if the sampling data has the negative offset, setting one of the random bits to a second logic level.

5. The method for generating the random number according to claim 1, wherein the step of sequentially analyzing the variation trend of the plurality of digital data in a time sequence by using the estimation procedure comprises:

selecting any two adjacent digital data one by one from the plurality of digital data as a first sampling data and a second sampling data;

determining whether the second sampling data is greater than the first sampling data;

if the second sampling data is greater than the first sampling data, then determining that the second sampling data has a positive offset; and if the second sampling data is not greater than the first sampling data, then determining that the second sampling data has a negative offset.

6. The method for generating the random number according to claim 5, wherein the true random number comprises a plurality of random bits, and the step of generating the true random number based on the result of the estimation procedure comprises:

if the second sampling data has the positive offset, setting one of the random bits to a first logic level; and if the second sampling data has the negative offset, setting one of the random bits to a second logic level.

7. The method for generating the random number according to claim 1, wherein the step of sequentially analyzing the variation trend of the plurality of digital data in the time sequence by using the estimation procedure comprises:
obtaining an average of the plurality of digital data;
selecting the plurality of digital data one by one so as to sequentially set each of the plurality of digital data as a sampling data; and
calculating a difference between the sampling data and the average.

8. The method for generating the random number according to claim 7, wherein the true random number comprises a plurality of random bits, and the step of generating the true random number based on the result of the estimation procedure comprises:
encoding the difference to obtain a plurality of encoded bits; and
setting a part of the random bits of the true random number by using the encoded bits.

9. The method for generating the random number according to claim 1, wherein the step of sequentially analyzing the variation trend of the plurality of digital data in a time sequence by using the estimation procedure comprises:
selecting the plurality of digital data one by one so as to sequentially set each of the plurality of digital data as a sampling data, wherein each of the plurality of digital data comprises a plurality of data bits; and
detecting a variation of bit values of the data bits in the sampling data, and extracting a part of the data bits from the sampling data according to the detecting result.

10. The method for generating the random number according to claim 9, wherein the true random number comprises a plurality of random bits, and the step of generating the true random number based on the result of the estimation procedure comprises:
setting a part of the random bits of the true random number based on the part of the data bits extracted from the sampling data.

11. The method for generating the random number according to claim 1, wherein the step of extracting components of the plurality of digital data within the preset frequency band by using the estimation procedure comprises:
selecting the plurality of digital data one by one so as to sequentially set each of the plurality of digital data as a sampling data; and
filtering the sampling data by a filter operating within the preset frequency band to generate an offset data.

12. The method for generating the random number according to claim 11, wherein the true random number comprises a plurality of random bits, and the step of generating the true random number based on the result of the estimation procedure comprises:
setting a part of the random bits of the true random number based on a plurality of offset bits of the offset data.

13. A circuit for generating a random number, disposed in an electronic device, the circuit for generating a random number comprising:
an analog-to-digital converter adapted to sequentially generate a plurality of digital data in response to an analog signal inherent in the electronic device, wherein the analog-to-digital converter is shared in the electronic device; and
a controller adapted to utilize an estimation procedure to sequentially analyze a variation trend of the plurality of digital data in a time sequence or sequentially extract components of the plurality of digital data within a preset frequency band, the controller adapted to generate a true random number based on a result of the estimation procedure.

14. The circuit for generating the random number according to claim 13, further comprising:
a pseudo random number generator, wherein the controller further generates a random number seed based on the true random number, and the pseudo random number generator generates a pseudo random number based on the random number seed.

15. The circuit for generating the random number according to claim 13, wherein the electronic device comprises a signal generator for generating the analog signal, and the electronic device calibrates the analog signal generated by the signal generator according to the plurality of digital data.

16. The circuit for generating the random number according to claim 13, wherein the controller obtains an average of the plurality of digital data and selects the plurality of digital data one by one so as to sequentially set each of the plurality of digital data as a sampling data; the controller determines whether a value of the sampling data is greater than the average; wherein the true random number comprises a plurality of random bits, if the value of the sampling data is greater than the average, the controller determines that the sampling data has a positive offset and sets one of the random bits to a first logic level; and if the value of the sampling data is not greater than the average, the controller determines that the sampling data has a negative offset and sets one of the random bits to a second logic level.

17. The circuit for generating the random number according to claim 13, wherein the controller selects any two adjacent digital data one by one from the plurality of digital data as a first sampling data and a second sampling data; the controller determines whether the second sampling data is greater than the first sampling data; wherein the true random number comprises a plurality of random bits, if the second sampling data is greater than the first sampling data, the controller determines that the second sampling data has a positive offset and sets one of the random bits to a first logic level; and if the second sampling data is not greater than the first sampling data, the controller determines that the second sampling data has a negative offset and sets one of the random bits to a second logic level.

18. The circuit for generating the random number according to claim 13, wherein the controller obtains an average of the plurality of digital data and selects the plurality of digital data one by one so as to sequentially set each of the plurality of digital data as a sampling data; and the controller calculates a difference between the sampling data and the average, and encodes the difference to obtain a plurality of encoded bits; wherein the true random number comprises a plurality of random bits, and the controller sets a part of the random bits of the true random number by using the encoded bits.

19. The circuit for generating the random number according to claim 13, wherein the controller selects the plurality of digital data so as to sequentially set each of the plurality of digital data as a sampling data, wherein each of the plurality of digital data comprises a plurality of data bits; the controller detects a variation of bit values of the data bits of the sampling data, and extracts a part of the data bits from the sampling data according to the detecting result; wherein the true random number comprises a plurality of random bits, and the controller sets a part of the random bits of the true random number based on the part of the data bits extracted from the sampling data.

20. The circuit for generating the random number according to claim 13, wherein the controller selects the plurality of digital data one by one to sequentially set each of the plurality of digital data as a sampling data; the controller uses a filter operating within the preset frequency band to filter the sampling data to thereby generate an offset data; wherein the true random number comprises a plurality of random bits, and the controller sets a part of the random bits of the true random number based on a plurality of offset bits of the offset data.

* * * * *